United States Patent [19]

Hartmann

[11] Patent Number: 5,355,790
[45] Date of Patent: Oct. 18, 1994

[54] DIAPHRAGM OF A PRESS INTENDED FOR SEPARATING LIQUID AND SOLID MATERIALS

[75] Inventor: Eduard Hartmann, Schneisingen, Switzerland

[73] Assignee: Bucher-Guyer AG Maschinenfabrik, Niederweningen, Switzerland

[21] Appl. No.: 836,268

[22] PCT Filed: Jun. 21, 1991

[86] PCT No.: PCT/CH91/00135
  § 371 Date: Mar. 3, 1992
  § 102(e) Date: Mar. 3, 1992

[87] PCT Pub. No.: WO92/00847
  PCT Pub. Date: Jan. 23, 1992

[30] Foreign Application Priority Data

Jul. 4, 1990 [CH] Switzerland .............. 2217/90

[51] Int. Cl.⁵ .............. B30B 5/02; B30B 9/22
[52] U.S. Cl. .............. 100/211; 99/495; 100/110
[58] Field of Search .............. 100/110, 116, 211, 107; 99/495; 114/103

[56] References Cited

U.S. PATENT DOCUMENTS

| 2,014,264 | 9/1935 | Patrick | 100/211 X |
| 4,024,810 | 5/1977 | Braun | 100/116 |
| 4,476,799 | 10/1984 | Bandy | 114/103 |
| 4,679,519 | 7/1987 | Linville | 114/103 |
| 5,038,700 | 8/1991 | Conrad | 114/103 |

FOREIGN PATENT DOCUMENTS 3515788 8/1986 Fed. Rep. of Germany ...... 100/211

Primary Examiner—Stephen F. Gerrity
Attorney, Agent, or Firm—Edmund M. Jaskiewicz

[57] ABSTRACT

A diaphragm (1) in a press vessel of a press intended for separating liquid and solid materials consists of two semicircular diaphragm parts (2) facing the front walls of the press vessel and of a diaphragm part (8) connected with these parts (2) on both sides and approximately corresponding to half the outer vessel wall. The diaphragm parts (2, 8) are formed from fabric (3, 13) with plastic coating on both sides and, semicircular diaphragm parts (2) are divided into segments. At least one of the thread systems forming a fabric (3) is aligned to a radial center bisector of each segment.

7 Claims, 2 Drawing Sheets

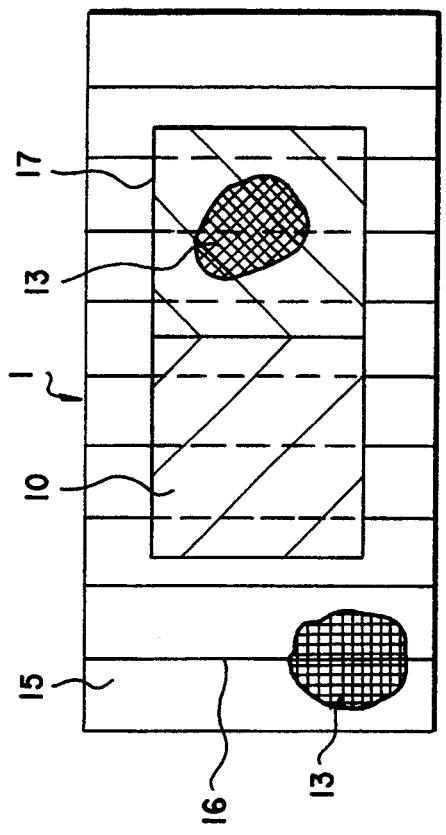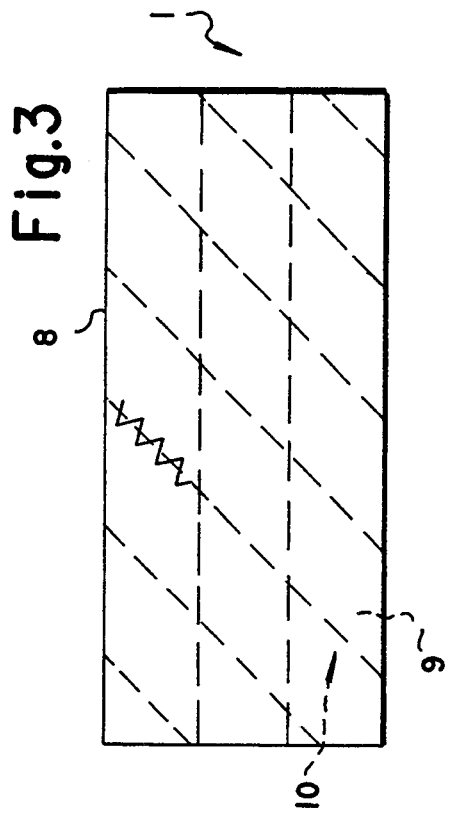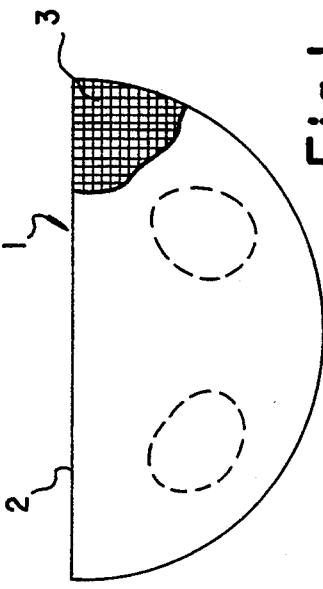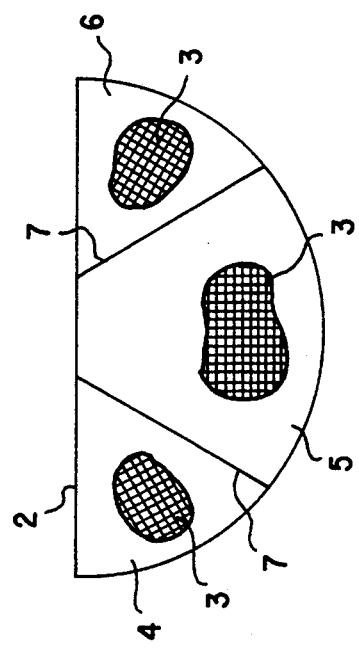

5,355,790

DIAPHRAGM OF A PRESS INTENDED FOR SEPARATING LIQUID AND SOLID MATERIALS

FIELD OF THE INVENTION

The invention relates to a diaphragm of a press intended for separating liquid and solid materials wherein the fabric of the diaphragm has a particular thread system.

DESCRIPTION OF THE PRIOR ART

Diaphragms of the above mentioned kind have become known among other things through pneumatically or hydraulically driven presses (CH-PS 604 841).

The pressing pressure exerted in the pressing space by air pressure or water pressure against a mash consisting of fruit, grapes, produce or berries located in the pressing space produces a drainage from which the squeezed-out juice leaves the pressing space through a drainage system consisting of ducts or a perforated vessel wall.

The pressing cycles necessary for extracting the juice from the mash are normally repeated in several time intervals. The partially squeezed-out mash is loosened up between the pressing cycles.

To absorb the pressure in the pressing space and to convey this pressure against the mash or other products, a diaphragm made of a fabric of yarn or the like that is coated on both sides with plastic has been generally used. Two thread systems forming warp and filling are interlinked with one another into a fabric by upward and downward interweaving movements.

At the point of intersection the thread systems partially loop around one another into interlacing points and cause the yarns or threads to come out not smooth but crimped.

This crimping is responsible for a so-called structural stretching, by which the crimping is drawn almost smooth as a result of the tensile load on the fabric. It thus becomes apparent that the dimensional stability in a direction diagonal to the warp and filling of the fabric is insufficient and the load is transferred to the plastic coating which is completely unsuited for this purpose.

The high tensile and shear forces lead to the destruction of the bond between fabric and coating and cause bubble-like hollow spaces between the plastic layers. The surfaces of the plastic layers then come loose from the fabric and afterward break out of the fabric structure.

This condition makes such a diaphragm completely unusable, since it can no longer fulfill the function of imperviousness between pressure space and pressing space in a pressure vessel.

SUMMARY OF THE INVENTION

This deficiency in prior art diaphragms has led to the object of the present invention, in which a diaphragm of the initially mentioned kind is to be made whose resistance to damage is significantly improved.

According to the invention this object is attained by a particular thread system.

As a result it becomes possible to reinforce the diaphragm by appropriate measures on the parts thereof which are subjected to high stresses, either by a controlled alignment of the thread systems or by an additional provision of a thread systems according to kind and direction of the stress on the diaphragm.

It is particularly advantageous to provide a diaphragm which is fastened to the outer vessel wall in a plane passing through the central longitudinal axis of a cylindrical vessel lying in horizontal position and the diaphragm has at least a half vessel shape and an approximately semi-circular part facing the front wall of the vessel. The semi-circular diaphragm part consists of several segment-like sections, so that in each case one of the thread systems forming a fabric runs approximately parallel to the radial center bisector of a segment-like section. In other words, the diaphragm part facing a front or end wall of the vessel that is particularly stressed by the pressure spreading approximately perpendicular to the vessel wall experiences a significantly better deformation stability. With just two such segment-like sections a noticeable improvement of the wear properties in the semicircular diaphragm parts occurs through the alignment of the thread systems in divergent directions. Three segment-like sections further reinforce the semicircular diaphragm part.

Alternatively, a similar sheet whose thread systems run approximately diagonal to the thread systems of the diaphragm, can be fastened upon the diaphragm. The fastening of the sheet takes place according to the time-tried methods of welding and sewing.

Here a distinction is to be made as to whether the sheet is to be attached on the inside or the outside of the diaphragm.

The diaphragm consists of two semicircular diaphragm parts directed toward the fronts of the half vessel form, and between these semi-circular parts an additional diaphragm part covering approximately half the outer wall of the vessel form is provided. All of the diaphragm parts together form a tub-like body.

In the area of the reinforced diaphragm the sheets are advantageously designed in the shape of sections of a web, so that they are adaptable to the stress of the diaphragm. Particularly in the zones of the discharge elements and/or drainage elements, the application of an additional sheet is useful.

The lesser longitudinal stretching of the warp with respect the filling of a fabric, is cause for action so that the warp—also called single warp—, is placed on the sheet to be welded on in the direction of the greatest effect of forces on the diaphragm.

To attain an optimal design of the diaphragm against harmful effects because of high stresses, that portion of the diaphragm in the area facing the outer vessel wall of a press vessel can be connected with sections of a sheet made of a plastic-coated fabric over at least one part of its surface, so that the warp, or the warp threads or warp yarns of the fabric of the sheet sections run approximately diagonal to the warp and filling thread systems of the diaphragm.

BRIEF DESCRIPTION OF THE DRAWING

Below the invention is discussed with reference to several embodiments represented in the drawing, wherein:

FIG. 1 is a plan view of a known semicircular diaphragm part facing a front wall of the half vessel form, FIG. 2 is a plan view of a semicircular diaphragm part according to the invention, facing the front wall of the half vessel form, FIG. 3 is a plan view of a diaphragm laid out in a plane, FIG. 4 is a cross-section through a reinforced diaphragm, FIG. 5 is a plan view of an alternative diaphragm laid out in a plane.

DESCRIPTION OF THE PREFERRED EMBODIMENTS

Figure 6:
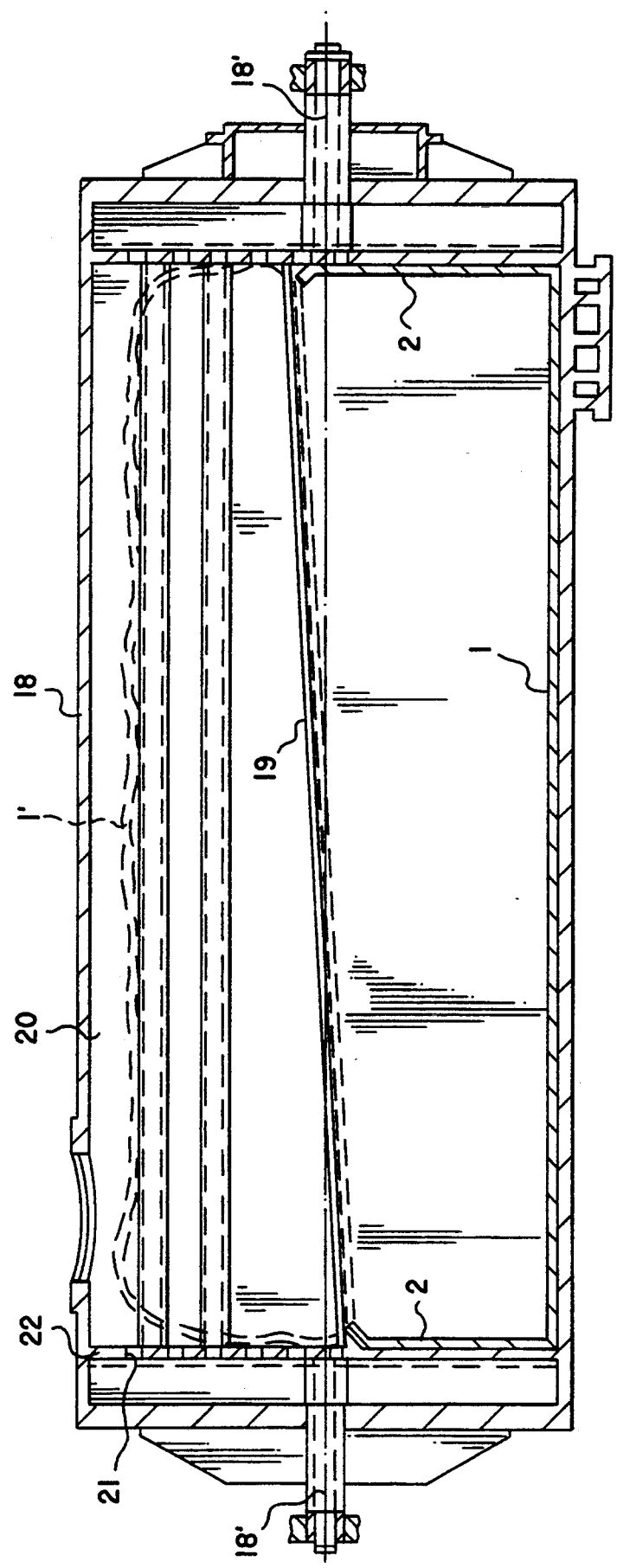
FIG. 6 is a longitudinal sectional view through a cylindrical pressure vessel showing a diaphragm therein having a portion attached to the inner surface of the vessel wall and semi-circular end portions

FIG. 1 shows on an approximately semicircular diaphragm part 2, a cut-away of coated fabric 3 consisting of warp and filling of a diaphragm 1 belonging to the prior art. From this representation it can be seen that the tensile and shear stresses acting approximately radially can be taken up by the fabric precisely only in horizontal and vertical, directions without overstretching of the diaphragm, while the larger segment areas between them are stressed diagonally to the fabric and cause damage to the coating for lack of sufficient extensibility.

The plastic layers come loose from the fabric in the form of bubbles (see areas marked with dotted lines), and these plastic layers then break out of the diaphragm.

In view of this situation it would be desirable for a thread system of this diaphragm part to have radially arranged warp threads. Since such an arrangement cannot be achieved from manufacturing technology, a substantially equivalent compromise must be sought.

An embodiment easy to use in practice according to the present invention is illustrated in FIG. 2. In this embodiment the semicircular diaphragm part 2 was divided into several segment-like sectors 4 to 6, and care had to be taken that seams 7 connecting segments 4 to 6 because of their processing into various kinds of articles do not converge at one point (center). By the segmenting of diaphragm part 2 into several segments it is possible to arrange these segments so that one of the thread systems, preferably the warp, is aligned, in each of the segments, approximately radially to the center. In this manner the forces at diaphragm part 2 can run with increased frequency at any one time in the direction of one thread system that is approximately concentrated on the radial center bisector of a segment.

In FIG. 3 an alterative embodiment of reinforced diaphragm 1 is shown wherein diaphragm part 8 facing the half outer wall of a cylindrical press vessel is shown laid out in a plane. The dotted lines indicate sections 9 of a web 10 made of a coated fabric, as it can be laid, for example, over the whole surface of diaphragm part 8, then welded and/or sewn together. Obviously sections 9 can also be partially applied to diaphragm parts 2 and 8.

FIG. 4 shows diaphragm 1 reinforced with sheet 11 of a similar kind, or parts of it. Here it can be seen that diaphragm 1 is coated only on one side 12 and that on the opposite side of fabric 13 an additional sheet 11 is provided by a connecting layer 14 made of plastic. Connecting layer 14 was selected to be thin, so that diaphragm 1 remains flexible and does not experience too strong shear forces during its movements.

FIG. 5 shows diaphragm 1, which comprises several webs 15 running crosswise or transversely to the axis of a press vessel. Thus, any damaging of the diaphragm, in particular because of friction forces arising when the mash is loosened can be largely prevented. Further, the warp of fabric 13 of the diaphragm preferably runs in a circumferential direction with respect to the press vessel, such that a high degree of form stability of the diaphragm can be attained. For the reinforcement of the diaphragm, particularly at places, where the diaphragm comes in contact with a discharge device on the vessel wall, additional sheets made of a coated fabric are placed in a direction deviating from that of the fabric of the diaphragm. These additional sheets can be designed as sections of webs to surface elements 17 and be connected with the diaphragm, and in turn attention should be paid to the alignment of the thread systems to a multiaxial thread composite. In other words, the warp of the individual sheets should be placed crosswise to the extension of the discharge elements.

FIG. 6 shows a known cylindrical pressure vessel 18 mounted on stub shafts 18' in which the diaphragm 1 is attached. The diaphragm has a portion 19 having a shape substantially corresponding to the cylindrical wall of the cylindrical pressure vessel and semi-circular end portions 2 such that the entire diaphragm has a tub-like shape. The diaphragm 1 is shown in the loaded position after material to be pressed is loaded into an area 20 within the vessel above the diaphragm as seen in FIG. 6. Introduction of a pressure medium below the diaphragm will urge the diaphragm upwardly to eventually occupy the position 1'. The squeezed juice or liquid is discharged through the openings 21 in end walls 22 of the cylindrical pressure vessel.

I claim:

1. A diaphragm for a press for separating liquid and solid materials wherein the press comprises a cylindrical press vessel disposed in a substantially horizontal position, the pressure vessel having a substantially cylindrical wall interconnecting a pair of substantially circular front walls, said diaphragm connected to said cylindrical wall in a longitudinal plane passing through the central longitudinal axis of the cylindrical wall of the cylindrical press vessel in the interior of said press vessel to divide the press vessel into a pressure space and a pressing space, said diaphragm comprising a fabric having two sides and at least one plastic-coated sheet on one of said sides of said fabric, said diaphragm further comprising a first portion having a shape substantially corresponding to the cylindrical wall of said cylindrical pressure vessel and a semi-circular portion directed toward one of said front walls, said diaphragm being subjected to main stresses in a direction when a pressure source is imposed on said diaphragm in said pressure space, said fabric having a plurality of thread systems and at least one of said thread systems disposed in said direction of imposed main stresses, said semi-circular diaphragm portions comprising a plurality of segment-like sectors, one of the thread systems in each of said sectors extending substantially parallel to a central radial bisector of each said sector.

2. A diaphragm according to claim 1 and comprising an additional plastic-coated sheet fastened on said diaphragm and having thread systems running substantially diagonally to the thread systems of the fabric of said diaphragm.

3. A diaphragm according to claim 2 wherein said additional plastic coated sheet is fastened on one of said two sides of said diaphragm.

4. A diaphragm according to claim 2 wherein said additional plastic coated sheet comprises segments (9) of a web (10).

5. A diaphragm according to claim 4 and further comprising a plurality of said additional plastic coated sheet segments (9) fastened adjacent to one another to said diaphragm.

6. A diaphragm according to claim 1 comprising two of said semi-circular diaphragm portions and each said portion facing a front wall of the press vessel, said first diaphragm portion facing substantially a half of said vessel wall and connected to said semi-circular portions.

7. A diaphragm according to claim 1 wherein the warp of fabric (3, 13) of the first cylindrical portion of said diaphragm is disposed in circumferential direction of the cylinder corresponding to the wall of the press vessel.

* * * * *